United States Patent
Chow et al.

(10) Patent No.: US 12,130,507 B1
(45) Date of Patent: Oct. 29, 2024

(54) ELECTRICALLY-RECONFIGURABLE OPTICAL DEVICE STRUCTURES WITH PHASE CHANGE MATERIALS

(71) Applicant: HRL Laboratories, LLC, Malibu, CA (US)

(72) Inventors: David Chow, Malibu, CA (US); Joseph Jensen, Malibu, CA (US); Jeong-Sun Moon, Malibu, CA (US); Kyung-Ah Son, Malibu, CA (US); Ryan Quarfoth, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 18/204,158

(22) Filed: May 31, 2023

(51) Int. Cl.
*G02F 1/01* (2006.01)
*G01J 1/04* (2006.01)
*G02F 1/17* (2019.01)

(52) U.S. Cl.
CPC .......... *G02F 1/0147* (2013.01); *G01J 1/0407* (2013.01); *G02F 1/17* (2013.01)

(58) Field of Classification Search
CPC ......... G02F 1/0147; G02F 1/17; G01J 1/0407
See application file for complete search history.

(56) References Cited

U.S. PATENT DOCUMENTS

| | | | | |
|---|---|---|---|---|
| 6,366,254 | B1 * | 4/2002 | Sievenpiper | H01Q 21/20 343/770 |
| 9,368,720 | B1 * | 6/2016 | Moon | H10N 70/8828 |
| 9,972,905 | B2 | 5/2018 | Schaffner et al. | |
| 11,187,891 | B1 | 11/2021 | Moon et al. | |
| 11,314,109 | B1 * | 4/2022 | Moon | G02F 1/0147 |

(Continued)

OTHER PUBLICATIONS

U.S. Appl. No. 15/599,434, HRL Laboratories, LLC.

(Continued)

*Primary Examiner* — Georgia Y Epps
*Assistant Examiner* — Don J Williams
(74) *Attorney, Agent, or Firm* — Ladas & Parry, LLP

(57) ABSTRACT

A reconfigurable optical frequency selective structure having embedded therein:
(a) an array of optical antennas for picking up propagating radiation in a visible or infrared frequency region and achieving preferential absorption of electromagnetic energy at a target wavelength k within the region,
(b) an array of optical mesa structures of sub-wavelength scale including a phase-change material, the array of optical antennas being disposed atop the array of optical mesa structures respectively;
(c) a metal ground plane disposed beneath the array of optical mesa structures, the array of optical mesa structures standing above the ground plane or an interfacial layer and being separated from one another to inhibit parasitic capacitance coupling therebetween; and
(d) a plurality of heaters for selectively heating any one of the array of optical mesa structures to cause the phase change material in the selected optical mesa structure to change from an amorphous state, wherein the antenna atop the selected mesa structure is capacitively coupled to the metal ground plane, to a crystalline state wherein the antenna atop the selected mesa structure is electrically shunted to the ground plane via the selected mesa structure.

26 Claims, 8 Drawing Sheets

| 2-color O-FSS | Color 1 | Color 2 |
|---|---|---|
| Configuration #1 | Off | Off |
| Configuration #2 | On | Off |
| Configuration #3 | Off | On |
| Configuration #4 | On | On |

(56) References Cited

U.S. PATENT DOCUMENTS

2002/0176134 A1* 11/2002 Vohra ............... H04J 14/0213
                                                                385/24
2021/0191162 A1* 6/2021 Bian ............... G02F 1/0126

OTHER PUBLICATIONS

U.S. Appl. No. 15/599,434, filed May 18, 20217, non-publication request filed), Jeong-Sun Moon, et al.

Borodulin, P., et al., "Recent Advances in Fabrication and Characterization of GeTe-based phase-change RF switches and MMICs", IEEE MTT-S 2017 International Microwave Symposium Digest, 2017, pp. 285-288.

Kang, S. et al., "Ultra-narrowband metamaterial absorbers for high spectral resolution infrared spectroscopy", Adv. Optical Materials, 1801236, 2018 (8 pages).

Moon, J. S., et al., "Development toward high-power sub-1 ohm DC-67 GHz RF switches using phase change materials for reconfigurable RF front-end", IEEE MTT-S International Microwave Symposium, 2014. 10.1109/MWSYM.2014.6848334 (3 pages).

Moon, J. S., et al., "Electrically-programmable optical devices with phase change materials", SPIE Proceedings, 2020.

Moon, J. S., et al., "5 THz Figure-of-Merit Reliable Phase-change RF Switches for Millimeter-wave Applications", IEEE MTT-S International Microwave Symposium, Jun. 2018. DOI: 10.1109/MWSYM.2018.8439479, pp. 836-838.

Moon, J. S., et al., "Reconfigurable Infrared spectral imaging with robust phase change materials", SPIE Proceedings, 2019.

Qu, Y., et al., "Dynamic Thermal emission control based on ultrathin plasmonic metamaterials including phase-changing material GST", Laser Photonics Rev. 2017, 11, 1700091 (6 pages).

Tittl, A. et al., "A switchable mid-infrared plasmonic perfect absorber with multispectral thermal imaging capability", Adv. Mater. 2015, 27, pp. 4597-4603.

* cited by examiner

| 2-color O-FSS | Color 1 | Color 2 |
|---|---|---|
| Configuration #1 | Off | Off |
| Configuration #2 | On | Off |
| Configuration #3 | Off | On |
| Configuration #4 | On | On |

ELECTRICALLY-RECONFIGURABLE OPTICAL DEVICE STRUCTURES WITH PHASE CHANGE MATERIALS

GOVERNMENT LICENSE RIGHTS

This invention was made with government support. The government may have certain rights in the invention.

FIELD OF THE INVENTION

This invention relates to reconfigurable optical frequency-selective-surface (O-FSS) structures embedded with an optical antenna, phase change material (PCM), and a heater control block.

Electrical pulse signals are applied to the heater block, which reconfigure the PCM into an amorphous phase or crystalline phase. Depending on the phase of the PCM, the functionality of the O-FSS structures can be reconfigured to change the spectral response.

BACKGROUND OF THE INVENTION

Traditionally, antennas are operating in RF frequencies. High-performance optical antennas are not trivial to design due to the optical loss. Recently, Kang et al. have demonstrated a high-performance optical antenna to provide optical-resonance with a full-width-half-max (FWHM) less than 4%, close to the physical limit set by the material parameters. S. Kang et al., "Ultra-narrowband metamaterial absorbers for high spectral resolution infrared spectroscopy", Adv. Optical Materials, 1801236, 2018. This publication describes a metal/dielectric FSS structure that acts as an infrared optical filter. The optical antenna is not reconfigurable in terms of its spectral response.

Phase change materials (PCMs) have been commercialized for non-volatile memory and optical memory with GeSbTe (GST) alloys. Different PCMs such as GeTe and SbTe alloys are now being evaluated as RF switches and spatial light modulators. The PCM's optical applications are based on the fact that PCMs offer a dramatic change in optical refractive index, greater than >1, depending on their phases (amorphous versus crystalline). However, there are several challenges in optical PCMs for practical applications, which include optical loss, modulation depth, switching cycle reliability, switching efficiency, thermal cross-talk, and integration density, for instance.

There are publications that describe metal nano-antenna/blanket PCM/blanket metal FSS structure that acts as an infrared optical filter. Tittl et al., "A switchable mid-infrared plasmonic perfect absorber with multispectral thermal imaging capability", Adv. Mater. 2015, 27, 4597; Y. Qu et al., "Dynamic Thermal emission control based on ultrathin plasmonic metamaterials including phase-changing material GST", Laser Photonics Rev. 2017, 11, 1700091. As shown in FIGS. 1A and 1i, in these structures a metallic optical antenna is fabricated on top of a blanket layer of GST PCM layer and Au or Al reflector layer beneath the GST PCM layer. The PCMs were evaluated for reconfigurable optical meta-surfaces, where its optical resonance tends to be broader (i.e., a large FWHM) and the modulation depth was less than 10:1. Since the Au or Al reflector layer is a single sheet, the prior art devices are intended for control of the PCM layer in an entire form.

While the PCM is embedded for reconfigurability in these structures, the structures have limited design variables so their optical performance is limited. Moreover, the presence of PCM everywhere added to optical loss. Also, the structures do not have individual addressability, so the reconfigurability is very limited.

There has been a need for FSS structures comprising reconfigurable optical elements with individual addressability. There has also been a need for FSS structures that allow phase change materials to be embedded in a FSS to make a reconfigurable optical device with spectrally sharp resonant features that can be used, for example, as a notch filter or a bandpass filter.

SUMMARY OF THE INVENTION

In accordance with a preferred embodiment of the invention there is provided a reconfigurable optical frequency selective structure comprising embedded therein:
(a) an array of optical antennas for picking up propagating radiation in a visible or infrared frequency region and preferentially absorbing electromagnetic energy at a target wavelength k within the region, the array of optical antennas being of sub-wavelength scale and being separated from one another at a predetermined pitch or pitches;
(b) an array of optical mesa structures of sub-wavelength scale comprising a phase-change material, the phase change material comprising a chalcogenide-containing alloy, the array of optical antennas being disposed atop respective of the array of optical mesa structures; and
(c) a metal ground plane disposed beneath the array of optical mesa structures or, optionally, beneath an interfacial layer disposed between the metal ground plane and the array of optical mesa structures, the array of optical mesa structures standing on the ground plane or the interfacial layer and being separated from one another to inhibit parasitic capacitance coupling therebetween.

In accordance with a preferred aspect of this embodiment, the reconfigurable optical frequency selective structure comprises means for selectively heating any selected one of the array of optical mesa structures to cause the phase change material in the selected optical mesa structure to change from an amorphous state, wherein the antenna atop the selected mesa structure is capacitively coupled to the metal ground plane, to a crystalline state wherein the antenna atop the selected mesa structure is electrically shunted to the ground plane via the selected mesa structure.

In accordance with another preferred aspect of this embodiment, the means for selectively heating comprises a plurality of heater blocks of sub-wavelength scale embedded in a dielectric material and disposed beneath the metal ground plane or within openings in the metal ground plane with each of the plurality of heater blocks aligned beneath respective of the optical mesa structures. In accordance with a preferred aspect of this embodiment, each of the plurality of heater blocks comprises a TiW heater.

In accordance with a still further aspect of this embodiment, the array of optical antennas atop respective of the optical mesa structures are embedded in a first dielectric layer and the frequency selective structure comprises a substrate under the metal ground plane and a second dielectric layer is disposed between the substrate layer and the plurality of heaters to isolate the substrate from the plurality of heaters. Preferably, the substrate comprises silicon and the second dielectric layer comprises $SiO_2$.

In yet another preferred aspect of this embodiment, the array of optical antennas are metallic optical antennas.

Preferably, the array of optical antennas comprise a metal selected from the group consisting of Au, Al, Pt, Cr, and Cu.

In another preferred aspect of this embodiment, the array of optical antennas are dielectric optical antennas. Preferably, the array of optical antennas comprise a dielectric material selected from the group consisting of Ge, Si and $TiO_2$.

In yet another preferred aspect of this embodiment, the phase change material is an alloy comprising a chalcogenide selected from the group consisting of SbTe and doped-SbTe.

In a still further aspect of this embodiment, the predetermined pitch is less than $\lambda$, each optical antenna in the array of optical antennas has a thickness of less than $\lambda/5$, each optical mesa structure in the array of optical mesa structures has a thickness of less than $\lambda/10$, and the interfacial layer has a thickness of less than $\lambda/50$.

In another preferred embodiment of the invention, there is provided an apparatus comprising any of the reconfigurable optical frequency selective structures described herein, and means for applying electrical pulse signals selectively to each of the plurality of heater blocks to activate and inactivate the heaters.

In yet another preferred embodiment, the array of optical antennas comprises at least a first optical antenna for picking up and preferentially absorbing radiation at a first target wavelength $\lambda_1$ and a second optical antenna for picking up and preferentially absorbing radiation at a second target wavelength $\lambda_2$, the second target wavelength being different from the first target wavelength such that the array of optical antennas pick up and preferentially absorb radiation comprising wavelengths of a plurality of different colors, including a first color and a second color. In accordance with a preferred aspect of this embodiment, the array of optical antennas is disposed atop the array of optical mesa structures respectively with the first optical antenna disposed atop a first optical mesa structure and the second optical antenna disposed atop a second optical mesa structure, wherein the first and second optical mesa structures are separated from one another to inhibit parasitic capacitance coupling therebetween and to enable selective heating of each of the first and second optical mesa structures individually such that the first optical mesa structure, the second optical mesa structure or both can be selectively heated to cause the phase change material in the selectively heated optical mesa structure or structures to change from an amorphous state, wherein the antenna atop the selected mesa structure is capacitively coupled to the metal ground plane, to a crystalline state, wherein the antenna atop the selectively mesa structure is electrically shunted to the ground plane.

In accordance with another preferred aspect of this embodiment, the first and second optical mesa structures with first and second optical antennas atop are adjacent to one another and comprise at least a part of a first cluster of optical antenna/mesa structures forming a first unit-cell such that, by selectively heating the first optical mesa structure, the second optical mesa structure or both, the first unit-cell is reconfigurable into at least four (4) different optical configurations that are detectable in a spectral response from the presence or absence of the first and second colors in each of the at least four (4) different optical configurations.

In accordance with yet another preferred aspect of this embodiment, the second optical antenna has a thickness that is smaller than a thickness of the first optical antenna and smaller than $\lambda_2/8$, and the second optical mesa structure has a thickness that is smaller than a thickness of the first optical mesa structure and smaller than $\lambda_2/6$. Preferably, a gap between the first and second optical mesa structures is smaller than $\lambda_2/2$ with $\lambda_1$ being larger than $\lambda_2$. Preferably, each of the first and second optical antennas has a thickness that is 800A or larger and the first and second optical mesa structures have respective thicknesses that are larger than the thicknesses of the first and second optical antennas by at least $\lambda_1/20$ and $\lambda_2/20$ respectively.

In a still further preferred aspect of this embodiment, the reconfigurable optical frequency selective structure comprises at least a second cluster of optical antenna/mesa structures forming a second unit-cell, the second cluster of optical antenna/optical mesa structures comprising (i) a third optical antenna disposed atop a third optical mesa structure for picking up and preferentially absorbing radiation at the first target wavelength $\lambda_1$ and (ii) a fourth optical antenna disposed atop a fourth optical mesa structure for picking up and preferentially absorbing radiation at the second target wavelength $\lambda_2$. Preferably, each of the optical antenna/mesa structures of the second cluster may be of substantially the same configuration and dimension as the optical/antenna mesa structures of the first cluster, the first optical mesa structure of the first cluster being separated from the third optical mesa structure of the second cluster by a pitch that is smaller than wavelength $\lambda_2$ with wavelength $\lambda_2$ being smaller than wavelength $\lambda_1$.

In yet another preferred aspect of this embodiment, each of the first, second, third and fourth target wavelengths being different from one another such that the array of optical antennas pick up and preferentially absorb radiation comprising wavelengths of at least four (4) different colors. Preferably, the first, second, third and fourth optical mesa structures with first, second, third and fourth optical antennas atop are disposed in a first cluster forming a first unit-cell with each of the optical mesa structures in the first cluster being separated by a gap that is smaller than $\lambda_{4/2}$ and with each of $\lambda_1$, $\lambda_2$ and $\lambda_3$ being larger than 4 Preferably, means for selectively heating can selectively heat any and all combinations of the first, second, third and fourth optical mesas such that the unit-cell is reconfigurable into at least sixteen (16) different optical configurations that are detectable in a spectral response from the presence or absence of each of the at least four (4) different colors in each of the at least sixteen (16) different optical configurations.

In a still further aspect of this embodiment, the array of optical antennas comprises n optical antennas, including the first and second optical antennas, for picking up and preferentially absorbing radiation at n different target wavelengths respectively, each of the n target wavelengths being different from one another such that the n optical antennas pick up and preferentially absorb radiation comprising wavelengths of n different colors. Preferably, the n optical antennas atop respective of the optical mesa structures are disposed in the first cluster forming the first unit-cell, and means for selectively heating can selectively heat any and all combinations of the n optical mesa structures such that the unit-cell is reconfigurable into $2^n$ different optical configurations that are detectable in a spectral response from the presence or absence of each of the n different colors in each of the $2^n$ different optical configurations.

In a still further embodiment of the invention, there is provided a reconfigurable optical filter comprising one of the aforementioned reconfigurable optical frequency selective structures. In a preferred aspect of this embodiment the reconfigurable optical filter is a notch filter or a bandpass filter.

BRIEF DESCRIPTION OF THE DRAWING FIGURES

FIG. 1A is a line drawing of a prior art FSS structure depicting an optical Al antenna fabricated on top of a blanket layer of GST PCM capable of being switched from amorphous to crystalline phase and a graph showing reflectance at various wavelengths for each of the phases with optical antennas of 450 nm and 400 nm respectively. FIG. 1B is a line drawing of a prior art FSS structure depicting an optical Au antenna fabricated on top of a blanket layer of GST PCM layer with an Au reflector layer beneath the GST PCM layer, and a graph showing emissivity of the structure at different wavelengths and temperatures.

DETAILED DESCRIPTION

In contrast to the aforementioned nano-antenna/blanket PCM/blanket metal FSS structures of the prior art, the FSS structures of the invention comprise mesa PCM structures that are individually addressable. As used herein the term "mesa" denotes a type of PCM structure that stands up above another structure or layer, such as a metal ground plane or interfacial layer on which it is disposed, and is isolated from other, surrounding PCM structures. Such isolation may be achieved, by way of example, during fabrication of the structures by etching back a blanket PCM layer to leave a PCM structure isolated from the surrounding structures. Some of the advantages of providing an optical device with a mesa PCM structure, as opposed to the blanket PCM structure of the prior art, can be understood with reference to FIGS. 2A and 2B.

Reference herein to the "size", "dimension" or "scale" of an optical antenna refers to the length and width of the optical antenna. Thus, a description that an optical antenna has a thickness of less than $\lambda/5$ means that each of the length and width of the optical antenna is less than $\lambda/5$.

Figure 1A:
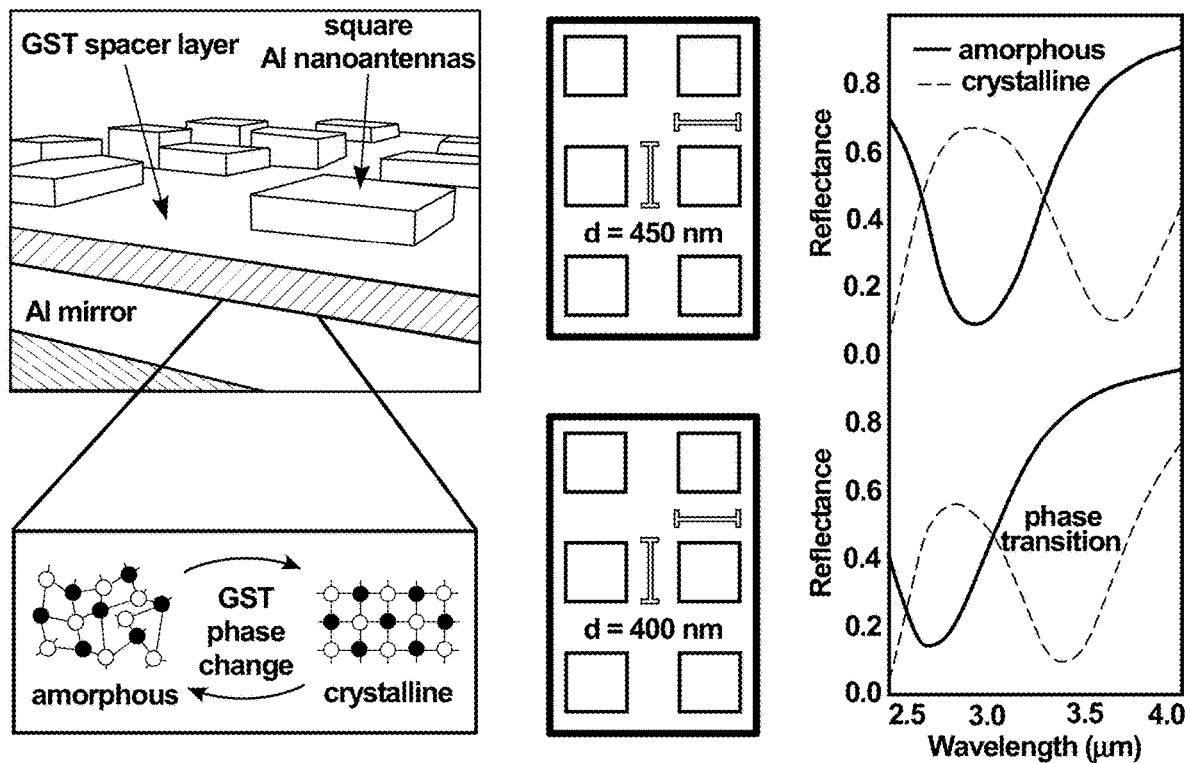
Figure 1B:
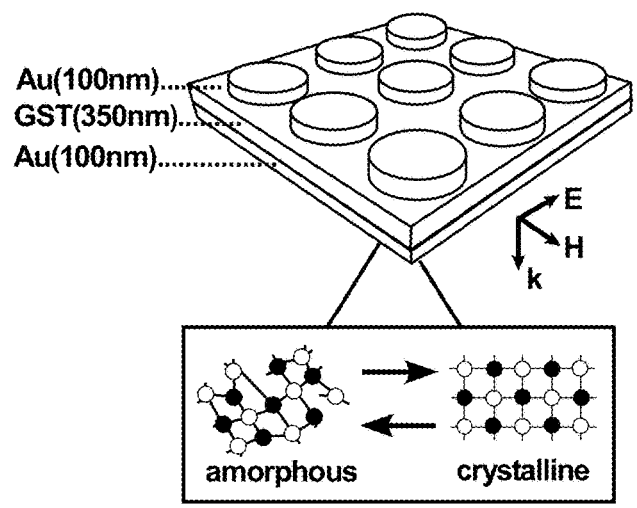
Figure 1B:
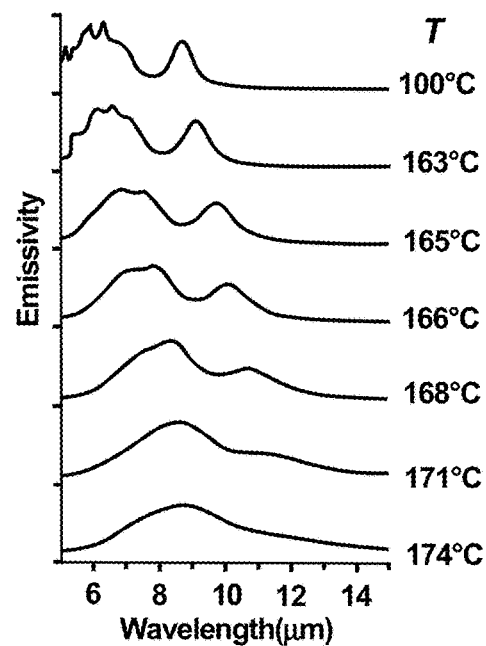
Figure 2B:
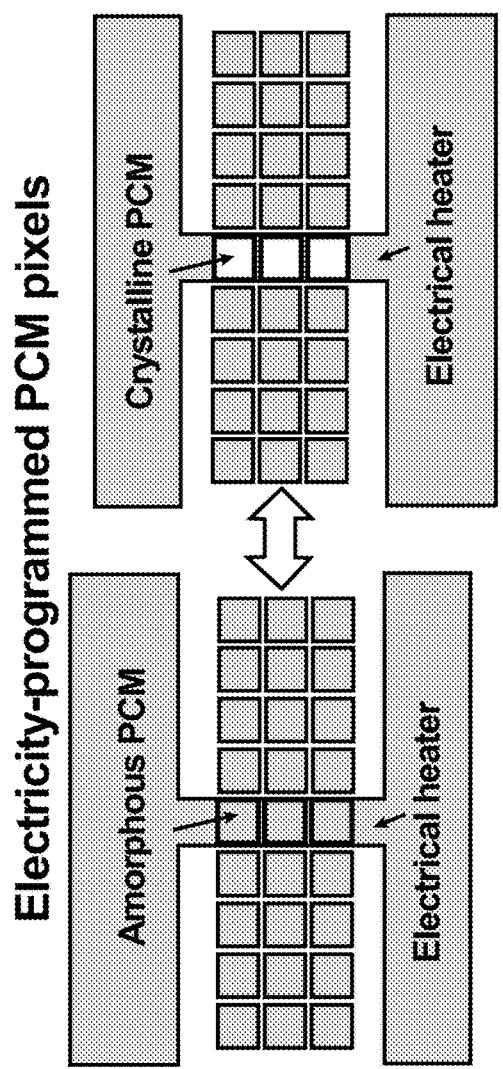
FIG. 2B is a line drawing of an array of PCM pixels under the control of an electrical heater for switching the PCM pixels between amorphous and crystalline phases.
Figure 2A:
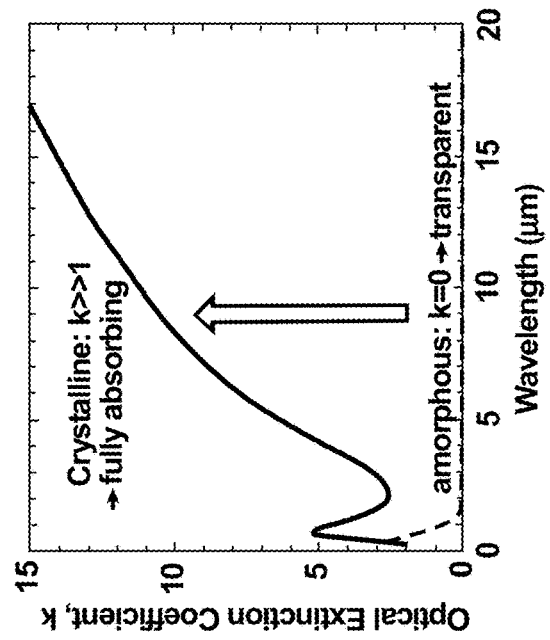
FIG. 2A is a graph showing the measured optical extinction coefficient of SbTe-based PCMs up to 16 µm wavelength with ellipsometry.

FIG. 2A shows the optical extinction coefficient of SbTe-based PCMs up to 16 µm wavelength with ellipsometry, showing a dramatic change in the refractive index (n, k) depending on their phase. For instance, at the wavelength of 10 µm, the imaginary part of the refractive index (n, k) changes from k=12 in the case of the crystalline phase to k<0.0001 in the case of the amorphous phase. Hence, depending on the phase, the IR light can be reflected or absorbed, creating IR modulation and contrast between the PCM-based IR modulator cells. FIG. 2B is a line drawing of a PCM array fabricated with a TiW control electrode beneath the PCM array. During its switching, the PCM cells change optical colors due to the change in the refractive index. FIG. 2B is a line drawing of the amorphous phase of the PCM (left side of figure) when the 1×3 PCM array was switched to the crystalline phase (right side of figure). The switching between the phases demonstrates a broadband optical intensity modulation. As shown in FIG. 2B, an electrical heater can be configured to heat selected pixels in the array whereby to change the phase of the PCM in the selected pixels of the array and not in others.

Reconfigurable PCM-based photonic platforms for reversibly switching phase change materials between amorphous and crystalline states through a controlled heating process are known in the art. Heating the PCM at a moderate temperature, e.g., about 160° C. can induce transition from amorphous to crystalline, and the melting of the PCM at high temperatures, e.g., above about 600° C. preferably followed by a fast cooling (>>1° C./ns) can be used to cause a reverse conversion from crystalline to amorphous, a process that is referred to as melt quenching. The required heat for phase switching can be supplied directly through heating or indirectly by optical and/or electrical stimuli. In the present invention, electrical heating, also known as Joule heating, is preferred with miniaturized heater blocks preferably comprising TiW integrated into the device platform.

With the miniaturized heater blocks, the required heat for phase switching between the crystalline and amorphous states may be obtained by applying a short, high-energy electrical pulse that melts the PCM followed by a rapid thermal quench, producing the amorphous phase (RESET operation). The crystalline phase is formed via a longer, lower-energy electrical pulse, which crystallizes the material (SET operation). A reading operation can be performed at a low voltage by reading the current and determining the high (RESET) or low resistance (SET) state. The PCM is decoupled from the current path through the integration of the PCM mesas on top of respective microheaters, so that the Joule heating can be controlled in the microheaters independent of the PCM phases in the mesas.

In a preferred aspect of the present invention, the PCM may be configured to a crystalline phase with a long (e.g., about 1 µsec) and low-amplitude (e.g., about 4 V) SET pulse applied to the heater blocks, and with the pulse causing the PCM temperature to rise above the crystallization temperature (e.g., about 160° C.). When the SET pulse is off, the PCM stays in the crystalline phase. The PCM is preferably re-configured to an amorphous phase with a short (e.g., about 300 nsec) and higher-amplitude (e.g., about 6V) RESET pulse applied to the TiW heater blocks with the pulse causing the PCM temperature to rise above the amorphization temperature (e.g., about 600° C.). When the RESET pulse is off, the PCM stays in the amorphous phase.

Figure 3:
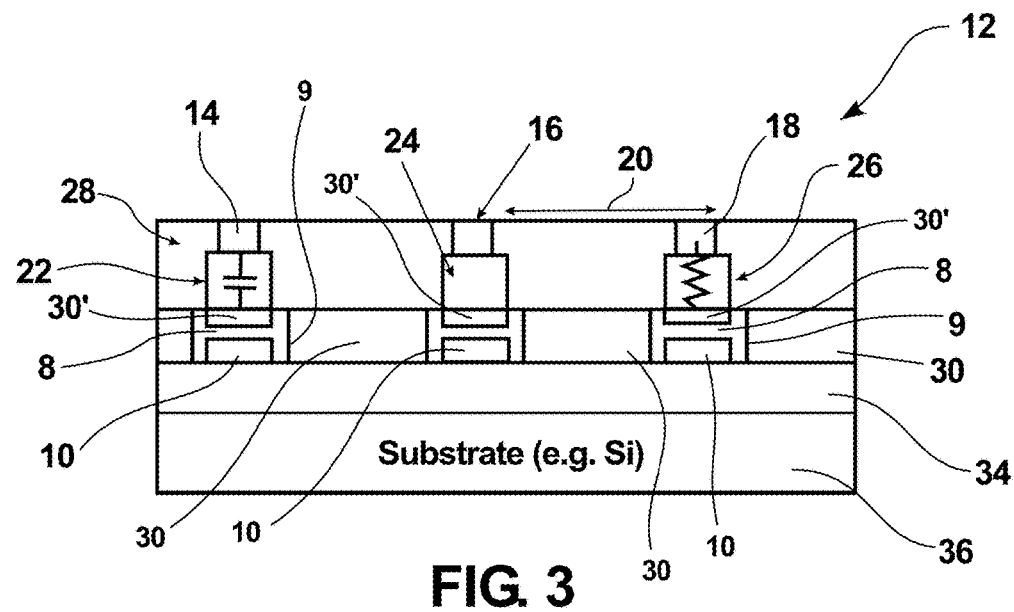
FIG. 3 is a schematic, cross-sectional view of an electrically-reconfigurable optical frequency-selective-surface (O-FSS) structure of the invention in a first embodiment.

Reference is now made to FIG. 3, wherein an electrically-reconfigurable optical frequency-selective-surface (O-FSS) structure 12 is shown in a preferred embodiment of the invention. As shown in FIG. 3, the reconfigurable O-FSS structure 12 comprises an array of optical antennas 14, 16, 18 in a top level of structure 12. The optical antennas, which operate in the visible and infrared frequency regions, can pick up energies efficiently from propagating electromagnetic (EM) waves at frequencies of interest and can achieve enhanced absorption of electromagnetic energy at a target wavelength k within these regions. The dimensions of the other components of the O-FSS structure are scaled to the target wavelength k.

Thus, the optical antennas for use in the invention are of sub-wavelength scale and preferably less than $\lambda/5$. The pitch 20 separating the center of each optical antenna in the array from the center of a next adjacent optical antenna is less than $\lambda$.

Figure 4:
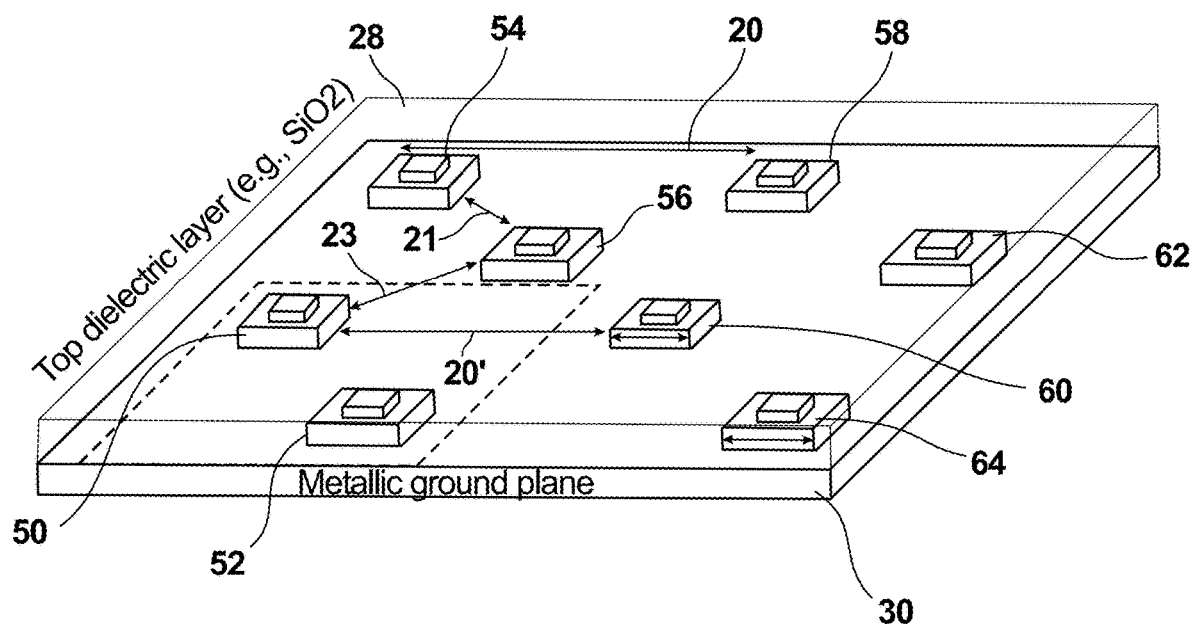
FIG. 4 is a perspective view of the electrically-reconfigurable optical frequency-selective-surface (O-FSS) structure of the invention.

In a preferred embodiment of the invention, the array of optical antennas may be arranged periodically in the O-FSS structure. In one preferred embodiment, the pitch separating each adjacent optical antenna in the array is the same with the pitch being less than the wavelength. Nevertheless, there are situations in which it may be desirable for the pitch separating adjacent optical antennas to differ, including those described below. FIG. 4 shows a perspective view of an O-FSS structure of the invention in which composite antenna/PCM mesas 50, 52, 54, 56, 58, 60, 62 and 64 may be of different sizes and the pitch 20, 20' and gaps 21, 23 between adjacent mesas may differ.

In a preferred embodiment, the optical antennas 14, 16, 18 comprise a metal such as Au or, Al, or, Pt or Cr or Cu. In another preferred embodiment, the optical antennas comprise a dielectric material such as Ge, Si or $TiO_2$. The size of each of the metallic or dielectric optical antennas is preferably less than $\lambda/5$ and, as discussed above, the respective optical antennas in the array can differ in size. The metallic and dielectric optical antennas are preferably of square or circular shape. While both metallic and dielectric optical antennas work well in the infrared wavelength range, the dielectric optic antennas work better in the visible wavelength range due to a reduced plasmonic loss compared with the metallic optical antennas.

With continued reference to FIG. 3, an array of PCM mesas 22, 24, 26 are disposed directly beneath respective of the optical antennas 14, 16, 18 at a next level of the O-FSS structure 12 with the respective antennas and PCM mesas forming composite PCM/antenna structures. The thickness of the PCM mesas is preferably less than $\lambda/10$. The PCM/antenna composites are preferably embedded in a dielectric layer 28, which protects the PCM from oxidation.

The phase change material in the composite antenna/PCM mesas is preferably an alloy comprising a chalcogenide phase change material which can be repeatedly switched between two distinct, non-volatile solid phases: crystalline and amorphous, where the crystalline phase is commonly electrically conductive and the amorphous phase is generally electrically resistive.

Examples of preferred alloys include the germanium-based alloys, GeTe and GST, which exhibit a change between metallic and dielectric response in the visible spectrum. Other Ga and Ge based chalcogenides (CHGs) incorporating sulphur and selenium, namely, gallium lanthanum sulfide (GLS) and GeSbSeTe (GSST), exhibit strictly dielectric responses over the visible and NIR spectral ranges. Indium and antimony based CHGs such as SbTe, SbS, and AgInSbTe (AIST) have also been demonstrated as material platforms with novel optical properties and are also useable in the invention Although any of these materials may be used in the invention, phase-change chalcogenides such as SbTe or doped-SbTe containing alloys are particularly preferred because they offer excellent optical resistance change between the crystalline and amorphous phases with a reduced thermal requirement for the switching. As used herein, "doped-SbTe" refers to a material, such as a ternary, quaternary, etc. material containing elements in addition to Sb and Te. For example, GeSbTe is considered herein as a "doped-SbTe".

Still referring to FIG. 3, a metallic ground plane layer 30 with openings or cavities 9 is disposed in a third level beneath the composite antenna/PCM mesas. This layer comprises a metal such as Au, Al, Pt, Cr, Cu, etc. that forms a broadband optical reflector serving as an electrical ground plane.

The metal ground plane layer 30 preferably has the openings or cavities disposed therein to house a plurality of electrical heaters 10. Preferably the heaters are TiW heaters that are activated by electrical pulses. The respective heaters 10 are disposed below and aligned with respective of the PCM/antenna composites so that each of the heaters can be individually addressed and caused to heat the PCM in a corresponding composite to cause it to change phase without heating the PCM in another PCM mesa. As shown in FIG. 3, the control heaters 10 are disposed within the respective openings or cavities 9 in the metallic ground plane and are embedded in a dielectric material 8 within the cavities. The same dielectric material can also be used to form a dielectric layer 34 below the ground plane layer 30. As with the other layers, the dimension of ground plane layer 30 is preferably smaller than the optical wavelength (k).

Dielectric layer 34 comprises a dielectric material such as SiNx or SiO2 and is disposed beneath the metal ground plane 30 and sits atop a layer 36 comprising a substrate. The substrate preferably comprises a semiconductor material, such as Si. The dielectric layer separates the substrate from the heaters so the substrate is isolated from them. The dimension of each of dielectric layer 28 and metal ground layer 30 is preferably smaller than the optical wavelength ($\lambda$). Dielectric layer 34 and substrate layer 36 may be the same size or thicker.

As discussed above, each of the PCM mesas can be switched between two distinct, non-volatile solid phases: crystalline and amorphous, where the crystalline phase is commonly electrically conductive and the amorphous phase is generally electrically resistive. As shown in FIG. 3, PCM mesa 22 is switched to the amorphous phase whereas PCM mesa 26 is switched to the crystalline phase. Since the PCM in mesa 22 is amorphous, the Au or other antenna is capacitively coupled to the ground. The impedance of a composite comprising, for example, an a-PCM+Au antenna may preferably be on the order of about 20 ohms/sq. and the O-FSS provides an optical response. Since the PCM in mesa 26 is changed to crystalline, the PCM has a low resistance and the Au or other antenna is electrically shunted to the ground via the PCM mesa. The optical response is reconfigured.

One of skill in the art will thus appreciate that, by changing the phase of the PCM in a selected mesa, the functionality of the O-FSS structures can be reconfigured to provide for differing spectral responses.

Figure 5:
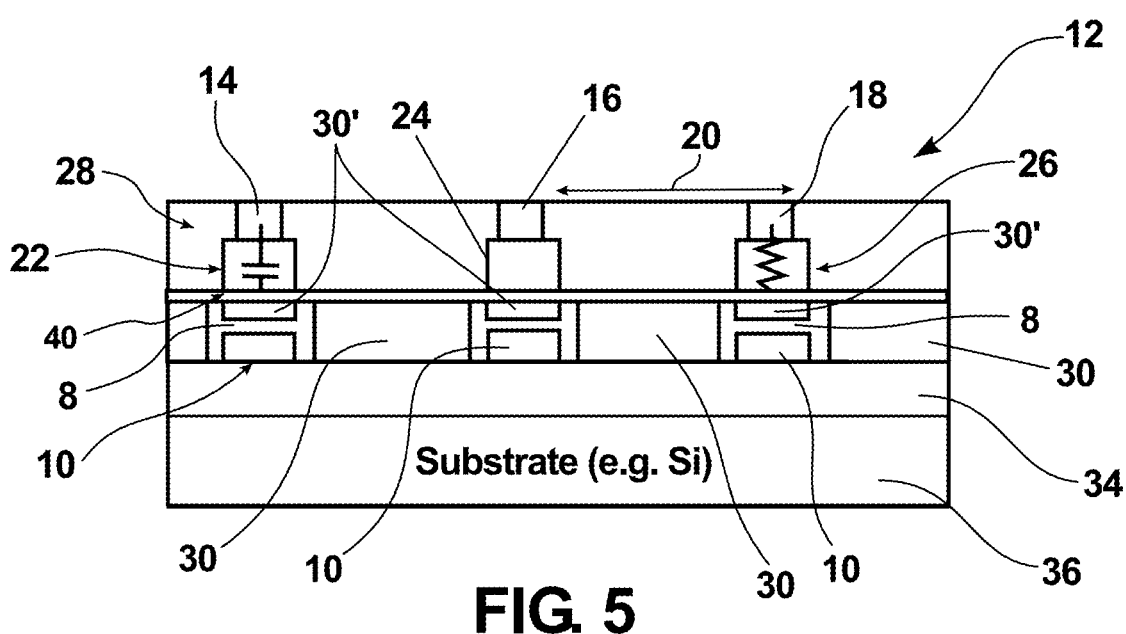
FIG. 5 is a schematic of an electrically-reconfigurable optical frequency-selective-surface (O-FSS) structure of the invention in a second embodiment.

FIG. 5 discloses another design of an electrically-reconfigurable optical frequency-selective-surface (O-FSS) structure, where the optical response of the O-FSS can be reconfigured with SbTe or another optical phase-change-material (PCM) defined in a sub-wavelength scale. In comparison to the first design disclosed in FIG. 3, the second design differs in providing an ultrathin (<$\lambda/50$) interfacial layer 40 added beneath the PCM mesa layer and on top of the metallic ground plane. The O-FSS structures described herein can be fabricated with electron-beam lithography and etching techniques well known to those of skill in the art. The openings 9 in FIGS. 3 and 5 for the heaters 10 may be formed in the metal ground plane 30 by etching portions of metal in the metal ground plane and filling with a dielectric layer 8 via a chemical mechanical polishing (CMP) process. Preferably, but not necessarily, some but not all of the metal may be removed from the metal ground plane 30 to form the openings 9 and the heaters 10 may be embedded in the dielectric layer 8 below residual portions 30' of the metal ground plane. The interfacial layer acts as an etching-stop during PCM etching and minimizes the etching of the metallic reflector and TiW heaters.

The other components of the O-FSS structure in FIG. 5 are the same as those in FIG. 3, as indicated by corresponding reference numerals for the corresponding components in the respective figures. The dimensions of the corresponding components can also be the same and the O-FSS structure of this embodiment will function in the same way as in the embodiment described above.

The above description refers to an O-FSS with individual pixel addressability and a single-color spectral response. The invention is not so limited, however, as it also comprises an O-FSS with individual pixel addressability and a multi-color spectral response displayable in any of a number of different configurations, as described next.

Figure 6:
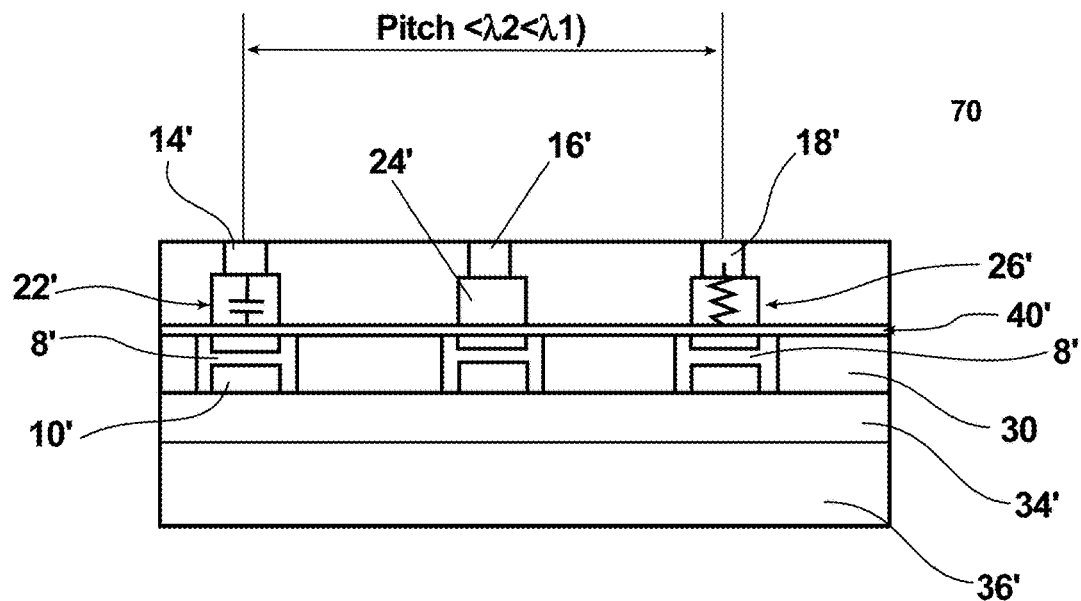
FIG. 6 is a schematic cross-sectional view of an electrically-reconfigurable multi-color optical frequency-selective-surface (O-FSS) structure with two-color operation.

Turning now to FIG. 6, there is shown an electrically-reconfigurable 2-color optical FSS of the invention. Specifically, FIG. 6 shows a schematic of an electrically-reconfigurable 2-color optical frequency-selective-surface (O-FSS) structure 70 that differs from the single-color O-FSS of FIG. 3 in that it comprises two (2) different sub-wavelength antennas disposed atop PCM mesas of different thicknesses. Specifically, antenna 16' is configured and arranged to resonate at a first target wavelength $\lambda_1$ whereas antennas 14' and 18' are configured and arranged to resonate at a second target wavelength $\lambda_2$, wherein $\lambda_2$ is smaller than $\lambda_1$. Antenna 16' is disposed atop PCM mesa 24' whereas antennas 14' and 18' are disposed atop PCM mesas 22' and 26' respectively. The thicknesses of the respective PCM mesas is a design variable that can preferably be made to vary depending on the wavelength. Thus, mesa 24' can be made to be thicker than mesas 22' and 26'. In short, the dimensions of the respective antennas and PCM mesas may preferably be scaled to the target wavelengths $\lambda_1$ and $\lambda_2$ for the O-FSS structure. The antenna dimensions and the PCM dielectric constant determines the target wavelength. The PCM mesa dimension is preferably selected to be small to minimize the inter-antenna coupling.

As described above, when any one of the PCM mesas is amorphous, the antenna atop the amorphous PCM mesa is capacitive-coupled to the ground, as shown for the composite of antenna 14' and PCM mesa 22' in FIG. 6. In that event, the composite a-PCM mesa 22'+antenna 14' has an impedance at the target wavelength $\lambda_2$ sufficient for the O-FSS to provide an optical response comprising a first color. Preferably, the composite has an impedance on the order of about 377 ohms. When the PCM is reconfigured to crystalline, as shown for the composite of antenna 18' and PCM mesa 26', the PCM layer has a low resistance and the antenna is electrically shunted to the ground via PCM mesa 26' and the O-FSS does not provide an optical response.

The same operation principle applies for the composite of antenna 16' and PCM mesa 24' at target wavelength $\lambda_1$. The composite PCM mesa 24'+antenna 16' can be switched between a first configuration, in which antenna 16' is capacitive-coupled to the ground, and a second configuration, in which antenna 16' is electrically shunted to the ground, by changing PCM mesa 24' from amorphous to crystalline. In the former configuration, the O-FSS can provide an optical response with a second color that is different from the first color. In the latter configuration it cannot provide an optical response.

Figure 7A:
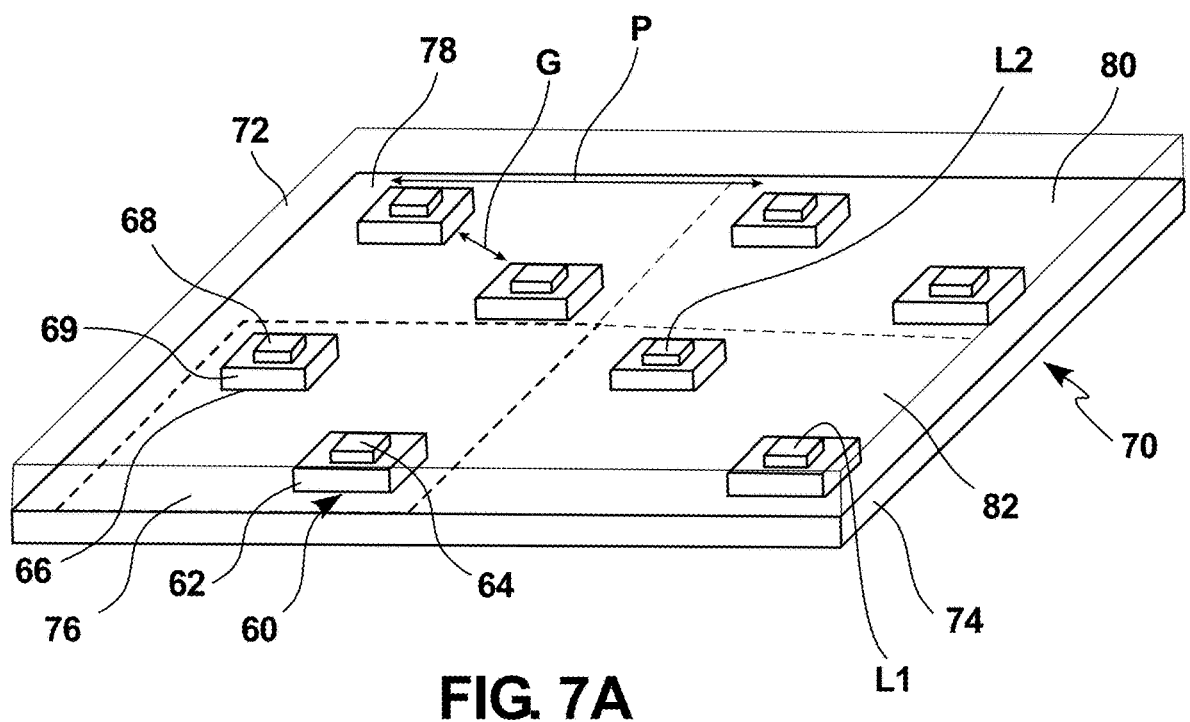
FIG. 7A is a perspective view of the top portion of an O-FSS structure with two-color unit-cell.
Figures 7B, 7C:
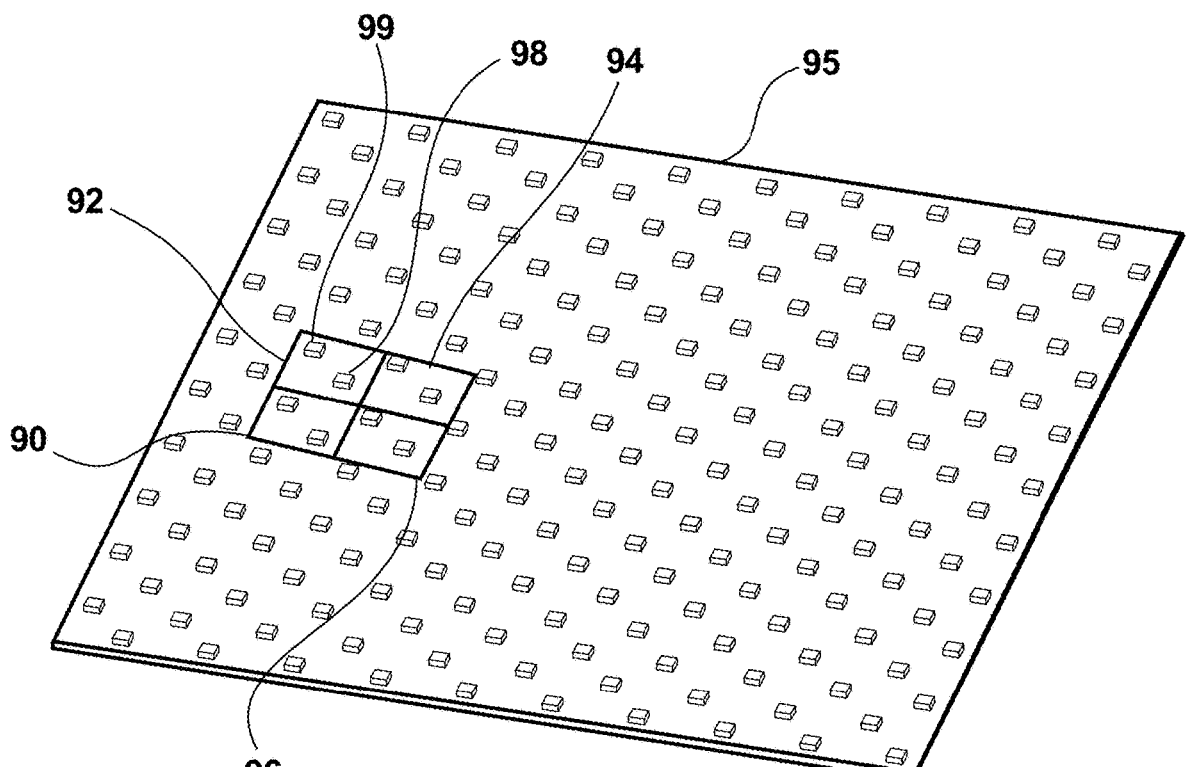
FIG. 7B is a perspective view of a 10×10 array of an O-FSS structure electrically-reconfigurable optical frequency-selective-surface (O-FSS) structure with two-color unit-cells and table of possible configurations of the unit cells.
FIG. 7C is a chart showing the possible configurations that can be achieved with each of the two-color unit-cells.

As shown in FIGS. 7A-7C, the respective antenna/mesa composites can be organized into a plurality of 2-color unit-cells comprising antenna/mesa composites that filter unit-cells comprising antenna/mesa composites that filter radiation at wavelengths $\lambda_1$ and $\lambda_2$. FIG. 7A shows an O-FSS 70 comprising an array of antenna/PCM mesa composites embedded in a top dielectric layer 72 disposed atop a metallic ground plane 74. The antenna/PCM composites are organized into clusters of unit-cells 76, 78, 80 and 82, each of which comprises a first antenna/PCM mesa composite 60 comprising a first PCM mesa 62 and a first antenna 64 resonating at wavelength $\lambda_1$ and a second antenna/mesa composite 66 comprising a second PCM mesa 69 and a second antenna 68 resonating at wavelength $\lambda_2$ with $\lambda_1$ being greater than $\lambda_2$. First antenna 64 has an antenna length L1 that is preferably smaller than $\lambda_2/8$ and second antenna 68 has a length L2 that is smaller than length L1. Preferably, L2=L1−Δ, where Δ is approximately $\lambda_2/60$. First and second antennas 64 and 68 are disposed on first and second PCM mesas 62 and 69 respectively with PCM mesa 62 having a length PCM L1 that is preferably smaller than $\lambda_2/6$ and PCM mesa 69 having a length PCM L2 that is smaller than PCM L1. Preferably, PCM L2=PCM L1−Δ, where Δ is approximately $\lambda_2/60$.

FIG. 7B shows a 10×10 array structure 95 of the 2-color O-FSS with unit-cells 90, 92, 94 and 96 defined in a sub-wavelength scale. Each of the unit-cells comprises two antenna/PCM mesa composites 98 and 99 with each of the composites targeted to a different wavelength. FIG. 7C lists the possible configurations of the 2-color unit cells and shows that, for each of the unit-cells, four different optical configurations comprising two (2) different colors are feasible due to the non-volatile nature of the PCM.

Referring to FIG. 7A, the architecture for the 2-color optical resonator design includes spacing between the antenna/PCM mesa composites that is scaled to the target wavelengths $\lambda_1$ and $\lambda_2$ while minimizing spectral cross-talk or shift. Preferably, the pitch P between antenna/PCM mesa composites is less than $\lambda_2$, with $\lambda_2$ being less than $\lambda_1$. The gap G between composites in each of the unit-cells is preferably less than $\lambda_2/2$.

Figure 8:
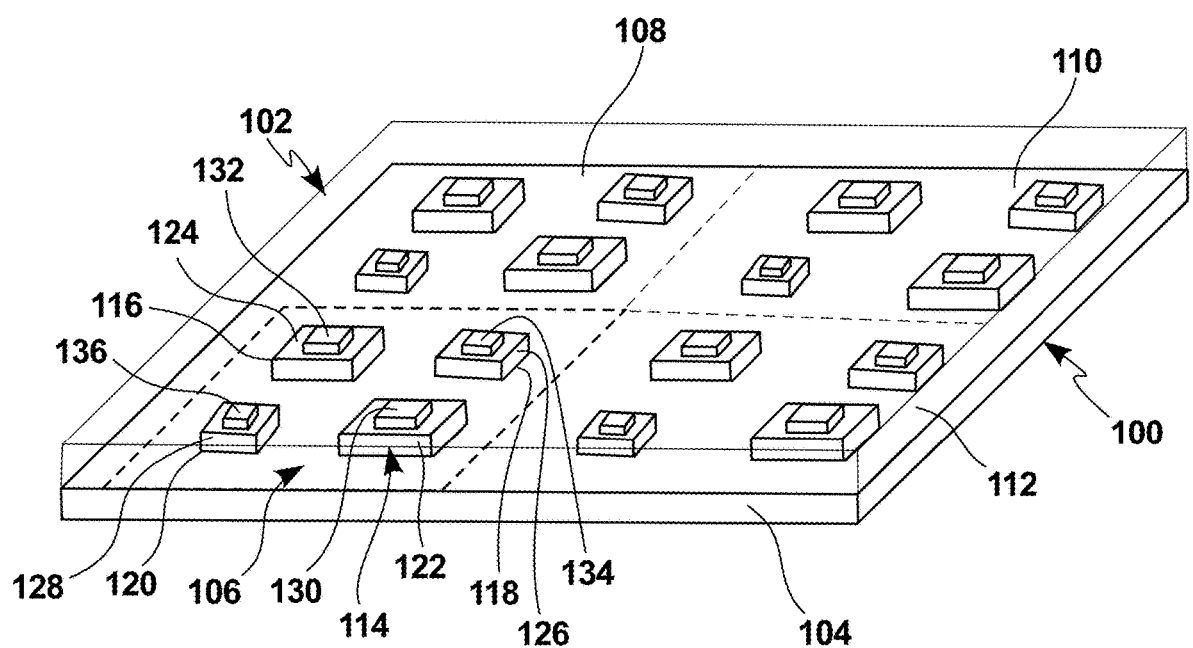
FIG. 8 is a perspective view of the top portion of an O-FSS structure with a four-color unit-cell.

Although the above description focuses on unit-cells comprising two-color designs, the multi-color optical device structures of the invention are not so limited. By way of example, FIG. 8 depicts an electrically-reconfigurable 4-color O-FSS structure 100 comprising an array of antenna/PCM mesa composites embedded in a top dielectric layer 102 disposed atop a metallic ground plane 104. The array of antenna/PCM composites is organized into unit-cells 106, 108, 110 and 112 with each unit cell comprising four antenna/PCM mesa composites with dimensions scaled to target wavelengths $\lambda_1$, $\lambda_2$, $\lambda_3$ and $\lambda_4$ respectively. The composites comprise respective antennas that resonate at different wavelengths and comprise PCM mesas of different size. As shown with reference to unit-cell 106, each of the unit cells comprises antenna/PCM mesa composites 114, 116, 118 and 120 comprising PCM mesas 122, 124, 126, 128 disposed below respective antennas 130, 132, 134 and 136 and with the antennas resonating at target wavelengths $\lambda_1$, $\lambda_2$, $\lambda_3$ and $\lambda_4$ respectively, wherein $\lambda_1 > \lambda_2 > \lambda_3 > \lambda_4$. Antenna 130 can have a length L1 that is preferably smaller than $\lambda_4/8$ with antennas 132, 132 and 136 having lengths L2, L3 and L4, wherein L1>L2>L3>L4. PCM mesa 122 can have a length PCM L1 that is preferably smaller than $\lambda_4/6$ with PCM mesas 124, 126 and 128 having respective lengths PCM L2, PCM L3 and PCM L4, wherein PCM L1>PCM L2>PCM L3>PCM L4. In a preferred embodiment, PCM L2=PCM L1−Δ; PCM L3=PCM L1−2Δ; and PCM L4=PCM L1−3Δ, wherein Δ is approximately $\lambda_4/60$.

The architecture for the 4-color optical resonator design includes spacing between the antenna/PCM mesa composites that is scaled to the target wavelengths $\lambda_1$, $\lambda_2$, $\kappa_4$, and $\lambda_4$ while minimizing spectral cross-talk or shift. Preferably, the pitch P between antenna/PCM mesa composites is less than $\lambda_4$, wherein $\lambda_1 > \lambda_2 > \lambda_3 > \lambda_4$. The gaps G between the composites in each of the unit-cells is preferably less than $\lambda_4/2$.

The optical response of the 4-color O-FSS depicted in FIG. 8 can be reconfigured depending on the phases of the four phase-change-material (PCM) mesas in a sub-wavelength scale. The four-color O-FSS can provide 16 different configurations that display four (4) different colors, but the invention is not so limited. The array of optical antennas can comprise at least n optical antennas for picking up and enhancing absorption of radiation at n different target wavelengths, with each of the n target wavelengths being different from one another such that the n optical antennas can pick up and enhance absorption of radiation comprising wavelengths of n different colors such that the unit-cell is reconfigurable into $2^n$ different optical configurations that are detectable in a spectral response from the presence or absence of each of the n different colors in each of $2^n$ different optical configurations.

In a preferred embodiment of the invention, the array of optical antennas is arranged periodically in the O-FSS structure. Nevertheless, there may be situations in which it may be desirable for the pitch separating adjacent optical antennas to differ.

The foregoing Detailed Description of exemplary and preferred embodiments is presented for purposes of illustration and disclosure in accordance with the requirements of the patent statute. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

Having now described the invention in accordance with the requirements of the patent statute, those skilled in this art will understand how to make changes and modifications to the present invention to meet their specific requirements or conditions. Such changes and modifications may be made without departing from the scope and spirit of the invention as defined by the following claims.

What is claimed is:

1. A reconfigurable optical frequency selective structure comprising embedded therein:
    (a) an array of optical antennas for picking up propagating radiation in a visible or infrared frequency region and achieving preferential absorption of electromagnetic energy at a target wavelength k within the region, the array of optical antennas being of sub-wavelength scale and being separated from one another at a predetermined pitch or pitches;
    (b) an array of optical mesa structures of sub-wavelength scale, including at least first and second optical mesa structures, each optical mesa structure in the array of optical mesa structures comprising a phase-change material, the phase change material comprising a chalcogenide-containing alloy, the array of optical antennas being disposed atop the array of optical mesa structures respectively;
    (c) a metal ground plane disposed beneath the array of optical mesa structures or, optionally, beneath an interfacial layer disposed between the metal ground plane and the array of optical mesa structures, the array of optical mesa structures standing above the ground plane or the interfacial layer and being separated from one another to inhibit parasitic capacitance coupling therebetween; and
    (d) means for selectively heating any selected one of the array of optical mesa structures to cause the phase change material in the selected optical mesa structure to change from an amorphous state in which the antenna atop the selected optical mesa structure is capacitively coupled to the metal ground plane to a crystalline state in which the antenna atop the selected optical mesa structure is electrically shunted to the metal ground plane via the selected optical mesa structure:
    wherein, with the antenna atop the selected optical mesa structure capacitively coupled to the metal ground plane the selected optical mesa structure provides the optical frequency selective structure with an optical response and, with the antenna atop the selected optical mesa structure electrically shunted to the ground plane the selected optical mesa structure does not provide the optical frequency selective structure with an optical response; and
    wherein components (a), (b), (c) and (d) are configured and arranged such that the optical frequency selective structure is reconfigurable in at least four (4) different optical configurations, including a configuration in which the first and second optical mesa structures provide the optical frequency selective structure with first and second optical responses respectively, a configuration in which neither of the first and second optical mesa structures provides the optical frequency selective structure with an optical response and configurations in which only one or the other of the first and second optical mesa structures provides the optical frequency selective structure with an optical response.

2. The reconfigurable optical frequency selective structure according to claim 1, wherein the means for selectively heating comprises a plurality of heater blocks of sub-wavelength scale embedded in a dielectric material and disposed beneath the metal ground plane or within openings in the metal ground plane with each of the plurality of heater blocks aligned beneath respective of the optical mesa structures.

3. The reconfigurable optical frequency selective structure according to claim 2, wherein each of the plurality of heater blocks comprises a TiW heater.

4. The reconfigurable optical frequency selective structure according to claim 1, wherein the array of optical antennas atop respective of the optical mesa structures are embedded in a first dielectric layer.

5. The reconfigurable optical frequency selective structure according to claim 1, further comprising a substrate under the metal ground plane, a second dielectric layer being disposed between the substrate layer and the plurality of heaters to isolate the substrate from the plurality of heaters.

6. The reconfigurable optical frequency selective structure according to claim 5, wherein the substrate comprises silicon and the second dielectric layer comprises $SiO_2$.

7. The reconfigurable optical frequency selective structure according to claim 1, wherein the array of optical antennas are metallic optical antennas.

8. The reconfigurable optical frequency selective structure according to claim 7, wherein the array of optical antennas comprise a metal selected from the group consisting of Au, Al, Pt, Cr, and Cu.

9. The reconfigurable optical frequency selective structure according to claim 1 wherein the array of optical antennas are dielectric optical antennas.

10. The reconfigurable optical frequency selective structure according to claim 9, wherein the array of optical antennas comprise a dielectric material selected from the group consisting of Ge, Si and $TiO_2$.

11. The reconfigurable optical frequency selective structure according to claim 1, wherein the phase change material is an alloy comprising a chalcogenide selected from the group consisting of SbTe and doped-SbTe.

12. The reconfigurable optical frequency selective structure according to claim 1, which comprises the interfacial layer disposed between the metal ground plane and the array of optical mesa structures.

13. The reconfigurable optical frequency selective structure according to claim 1, wherein the array of optical antennas is arranged periodically at the predetermined pitch.

14. An apparatus comprising the reconfigurable optical frequency selective structure according to claim 1, and means for applying electrical pulse signals selectively to each of the plurality of heater blocks to activate and inactivate them.

15. A reconfigurable optical filter comprising the reconfigurable optical frequency selective structure of claim 1.

16. The reconfigurable optical filter according to claim 15, wherein the optical filter is a notch filter or a bandpass filter.

17. The reconfigurable optical frequency selective structure according to claim 1, wherein the array of optical antennas comprises at least a first optical antenna for picking up and preferentially absorbing radiation at a first target wavelength $\lambda_1$ and a second optical antenna for picking up and preferentially absorbing radiation at a second target wavelength $\lambda_2$, the second target wavelength being different from the first target wavelength such that the array of optical antennas pick up and preferentially absorb radiation comprising wavelengths of a plurality of different colors, including a first color and a second color.

18. The reconfigurable optical frequency selective structure according to claim 17, wherein the first optical antenna is disposed atop the first optical mesa structure and the second optical antenna is disposed atop the second optical mesa structure, the first and second optical mesa structures being separated from one another to inhibit parasitic capacitance coupling therebetween and to enable selective heating of each of the first and second optical mesa structures individually such that the first optical mesa structure, the second optical mesa structure or both can be selectively heated to cause the phase change material in the selectively heated optical mesa structure or structures to change from an amorphous state, wherein the antenna atop the selected mesa structure is capacitively coupled to the metal ground plane, to a crystalline state, wherein the antenna atop the selectively mesa structure is electrically shunted to the metal ground plane.

19. The reconfigurable optical frequency selective structure according to claim 18, wherein the first and second optical mesa structures with first and second optical antennas atop are adjacent to one another and comprise at least a part of a first cluster of optical antenna/mesa structures forming a first unit-cell such that, by selectively heating the first optical mesa structure, the second optical mesa structure or both, the first unit-cell is reconfigurable into at least four (4) different optical configurations that are detectable in a spectral response from the presence or absence of the first and second colors in each of the at least four (4) different optical configurations.

20. The reconfigurable optical frequency selective structure according to claim 19, wherein the second optical antenna has a thickness that is smaller than a thickness of the first optical antenna and smaller than $\lambda_2/8$, and the second optical mesa structure has a thickness that is smaller than a thickness of the first optical mesa structure and smaller than $\lambda_2/6$, wherein a gap between the first and second optical mesa structures is smaller than $\lambda_2/2$ with $\lambda_1$ being larger than $\lambda_2$.

21. The reconfigurable optical frequency selective structure according to claim 20, wherein each of the first and second optical antennas has a thickness that is 800A or larger and the first and second optical mesa structures have respective thicknesses that are larger than the thicknesses of the first and second optical antennas by at least $\lambda_1/20$ and $\lambda_2/20$ respectively.

22. The reconfigurable optical frequency selective structure according to claim 19 further comprising at least a second cluster of optical antenna/mesa structures forming a second unit-cell, the second cluster of optical antenna/optical mesa structures comprising (i) a third optical antenna disposed atop a third optical mesa structure for picking up and preferentially absorbing radiation at the first target wavelength $\lambda_1$ and (ii) a fourth optical antenna disposed atop a fourth optical mesa structure for picking up and preferentially absorbing radiation at the second target wavelength $\lambda_2$, each of the optical antenna/mesa structures of the second cluster being of substantially the same configuration and dimension as the optical/antenna mesa structures of the first cluster, the first optical mesa structure of the first cluster being separated from the third optical mesa structure of the second cluster by a pitch that is smaller than wavelength $\lambda_2$ with wavelength $\lambda_2$ being smaller than wavelength $\lambda_1$.

23. The reconfigurable optical frequency selective structure according to claim 19,
wherein the array of optical antennas further comprises at least third and fourth optical antennas for picking up and preferentially absorbing radiation at a third target wavelength $\lambda_3$ and a fourth target wavelength $\lambda_4$ respectively, each of the first, second, third and fourth target wavelengths being different from one another such that the array of optical antennas pick up and preferentially absorb radiation comprising wavelengths of at least four (4) different colors;

wherein the first, second, third and fourth optical mesa structures with first, second, third and fourth optical antennas atop are disposed in the first cluster forming the first unit-cell with each of the optical mesa structures in the first cluster being separated by a gap that is smaller than $\lambda_4/2$ and with each of $\lambda_1$, $\lambda_2$ and $\lambda_3$ being larger than $\lambda_4$;

wherein the means for selectively heating can selectively heat any and all combinations of the first, second, third and fourth optical mesas such that the unit-cell is reconfigurable into at least sixteen (16) different optical configurations that are detectable in a spectral response from the presence or absence of each of the at least four (4) different colors in each of the at least sixteen (16) different optical configurations.

24. The reconfigurable optical frequency selective structure according to claim 19, wherein the array of optical antennas comprises n optical antennas, including the first and second optical antennas, for picking up and preferentially absorbing radiation at n different target wavelengths respectively, each of the n target wavelengths being different from one another such that the n optical antennas pick up and preferentially absorb radiation comprising wavelengths of n different colors, wherein the n optical antennas atop respective of the optical mesa structures are disposed in the first cluster forming the first unit-cell, and wherein the means for selectively heating can selectively heat any and all combinations of the n optical mesa structures such that the unit-cell is reconfigurable into $2^n$ different optical configurations that are detectable in a spectral response from the presence or absence of each of the n different colors in each of the $2^n$ different optical configurations.

25. The reconfigurable optical frequency selective structure according to claim 1, wherein the metal ground plane comprises one of a plurality of layers of the reconfigurable optical frequency selective structure, the metal ground plane having a top surface and a bottom surface that are connected by side surfaces, the top and bottom surfaces of the metal ground plane being sandwiched on top and bottom between other of the plurality of layers of the reconfigurable optical frequency selective structure, the side surfaces defining a periphery of the metal ground plane and being continuous around the periphery.

26. A reconfigurable optical frequency selective structure, comprising embedded therein:

(a) an array of optical antennas for picking up propagating radiation in a visible or infrared frequency region and achieving preferential absorption of electromagnetic energy at a target wavelength $\lambda$ within the region, the array of optical antennas being of sub-wavelength scale and being separated from one another at a predetermined pitch or pitches;

(b) an array of optical mesa structures of sub-wavelength scale comprising a phase-change material, the phase change material comprising a chalcogenide-containing alloy, the array of optical antennas being disposed atop the array of optical mesa structures respectively; and (c) a metal ground plane disposed beneath the array of optical mesa structures or, optionally, beneath an interfacial layer disposed between the metal ground plane and the array of optical mesa structures, the array of optical mesa structures standing above the ground plane or the interfacial layer and being separated from one another to inhibit parasitic capacitance coupling therebetween, wherein the predetermined pitch is less than $\lambda$, each optical antenna in the array of optical antennas has a thickness of less than $\lambda/5$, each optical mesa structure in the array of optical mesa structures has a thickness of less than $\lambda/10$, and the interfacial layer, if present, has a thickness of less than $\lambda/50$.

* * * * *